United States Patent Office 3,662,007
Patented May 9, 1972

3,662,007
PROCESS FOR PREPARING DIHYDRO-β-SANTALOL FROM 3-ENDO-METHYL-3-EXO(4'-METHYL-5'-HYDROXYPENTYL)NORCAMPHOR
Wayne I. Fanta, Colerain Township, Hamilton County, and William F. Erman, Springfield Township, Hamilton County, Ohio, assignors to The Procter & Gamble Company, Cincinnati, Ohio
No Drawing. Filed Nov. 26, 1968, Ser. No. 779,233
Int. Cl. C07c 35/00
U.S. Cl. 260—631.5        8 Claims

ABSTRACT OF THE DISCLOSURE

A process for preparing dihydro-β-santalol from 3-endo-methyl-3-exo(4'-methyl - 5' - hydroxypentyl)norcamphor comprising the steps of (1) reacting 1-endo-methyl-3-exo(4'-methyl - 5' - hydroxypentyl)norcamphor with either boric acid or boric anhydride to obtain the borate ester of 3-endo-methyl-3-exo(4'-methyl - 5' - hydroxypentyl)norcamphor, and (2) reacting the borate ester reaction product of Step (1) with a phosphorus compound such as methyltriphenylphosphonium bromide and subsequently hydrolyzing the reaction product with water to obtain dihydro-β-santalol is disclosed. Dihydro-β-santalol is useful as a perfume component.

FIELD OF THE INVENTION

This invention relates to a process for preparing dihydro-β-santalol, a compound having a valuable sandalwood odor useful in perfume compositions, from 3-endo-methyl-3-exo(4'-methyl-5'-hydroxypentyl)norcamphor by reacting it with either boric acid or boric anhydride to obtain the borate ester of 3-endo-methyl-3-exo(4'-methyl-5'-hydroxypentyl)norcamphor, and reacting the borate ester reaction product of Step (1) with a phosphorus compound, such as methyl triphenylphosphonium bromide, in strong base, followed by hydrolysis of the reaction product with water to obtain dihydro-β-santalol.

HISTORY OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited, and sometimes sporadic, supply. For this reason, a continuous effort has been made to synthesize various components of sandalwood oil or similar synthetic materials which possess the desirable woody fragrance of sandalwood oil.

The process presented herein for preparing dihydro-β-santalol from 3-endo-methyl-3-exo(4'-methyl-5'-hydroxypentyl)norcamphor represents a portion of an extensive scientific effort to obtain dihydro-β-santalol, a valuable synthetic sandalwood perfume. Other processes and intermediate compounds relating to the synthesis of dihydro-β-santalol are described in the following copending U.S. patent applications: Fanta and Erman, 3-Endo-Methyl-3-Exo(4'-Methyl-5'-Hydroxypentyl)Norcamphor and 2-Methyl-5-Bromopentanol, and Processes for the Preparation of These Compounds, Ser. No. 717,360, filed Mar. 29, 1968; Fanta and Erman, Tetrahydropyranyl Ether Compounds and Process for the Preparation of These Compounds and 3-Endo-Methyl-3-Exo(4'-Methyl-5'-Hydroxypentyl)Norcamphor, Ser. No. 717,384, filed Mar. 29, 1968, now abandoned; Fanta and Erman, Preparation of 3 - Endo-Methyl-3-Exo(4'-Methyl-5'-Hydroxypentyl)Norcamphor from 2-Methyl-4-Pentenol, Ser. No. 717,362, filed Mar. 29, 1968; Fanta and Erman, Preparation of 3 - Endo-Methyl-3-Exo(4'-Methyl-5'-Hydroxypentyl)Norcamphor from 2-Methyl-4-Pentenol, Ser. No. 717,374, filed Mar. 29, 1968; Fanta and Erman, Dihydro-β-Santalol and Process for Preparing Dihydro-β-Santalol from 3-Endo-Methyl-3-Exo(4'-Methyl - 5' - Hydroxypentyl)-Norcamphor, Ser. No. 717,458, filed Mar. 29, 1968; Kretschmar, Fanta and Erman, Process for Preparing 3-Endo-Methylnorcamphor from 2-Methylnorborn-2-Ene, Ser. No. 731,653, filed May 23, 1968; Gibson, Kretschmar and Erman, Process for Preparing 3-Methylnorcamphor from 2-Methylnorborn-2-Ene, Ser. No. 731,652, filed May 23, 1968; and Fanta and Erman, Process for Preparing Dihydro-β-Santalol from 3-Endo-Methyl-3-Exo(4'-Methyl-5'-Hydroxypentyl)Norcamphor, Ser. No. 753,897, filed Aug. 20, 1968.

SUMMARY OF THE INVENTION

The process of this invention comprises the steps of:
(1) Reacting 3-endo-methyl-3-exo(4'-methyl - 5' - hydroxypentyl)norcamphor having the structural formula

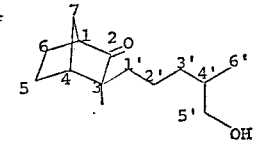

with a compound selected from the group consisting of boric acid, boric anhydride, and mixtures thereof, to obtain the borate ester of 3-endo-methyl-3-exo-(4'-methyl-5'-hydroxypentyl)norcamphor having the structural formula

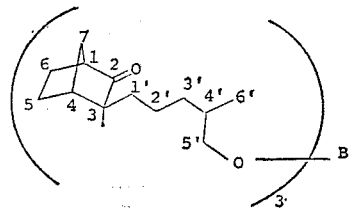

and
(2) Reacting the borate ester of 3-endo-methyl-3-exo (4'-methyl-5'-hydroxypentyl)norcamphor, the reaction product of Step (1), with a phosphorus compound selected from the group consisting of methyltriphenylphosphonium bromide, tetramethylphosphonium iodide, methyltricyclohexylphosphonium bromide, methyltri-N-piperidylphosphonium bromide, methyltri-N-morpholiumphosphonium iodide, diphenylmethylphosphine oxide, trimethylphosphine oxide, methyl-tri-p-tolylphosphonium bromide, methyltri-p-anisylphosphonium bromide, and methyl diethylphosphonate, in strong base, to obtain the borate ester of dihydro-β-santalol having the structural formula

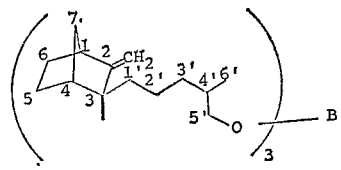

and subsequently, hydrolyzing the reaction product, the borate ester of dihydro-β-santalol, with water to obtain dihydro-β-santalol having the structural formula

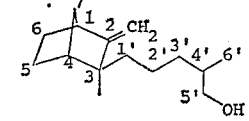

Dihydro-β-santalol, the product of the process, possesses a desirable, woody sandalwood fragrance and, thus, has utility as a perfume component.

DESCRIPTION OF THE PROCESS FOR PREPARING DIHYDRO-β-SANTALOL

The initial starting compound, 3-endo-methyl-3-exo(4'-methyl-5'-hydroxypentyl)norcamphor, and processes for preparing this compound are described in the following copending United States patent applications: Fanta and Erman, 3-Endo-Methyl - 3 - Exo(4'-Methyl-5'-hydroxypentyl)Norcamphor and 2-Methyl-5-Bromopentanol, and Process for the Preparation of These Compounds, Ser. No. 717,360, filed Mar. 29, 1968; Fanta and Erman, Tetrahydropyranyl Ether Compounds and Process for the Preparation of These Compounds and 3-Endo-Methyl-3-Exo(4'-Methyl - 5' - Hydroxypentyl)Norcamphor, Ser. No. 717,384, filed Mar. 29, 1968, now abandoned; Fanta and Erman, Preparation of 3-Endo-Methyl-3-Exo(4'-methyl-5' - Hydroxypentyl)Norcamphor from 2 - Methyl-4-Pentenol, Ser. No. 717,362, filed Mar. 29, 1968; and Fanta and Erman, Preparation of 3-Endo-Methyl-3-exo(4'-Methyl - 5' - Hydroxylpentyl)Norcamphor, Ser. No. 717,374, filed Mar. 29, 1968.

Step 1

The first step of this process comprises reacting 3-endo-methyl - 3 - exo(4'-methyl-5'-hydroxypentyl)norcamphor with boric acid or boric anhydride to obtain the borate ester of 3-endo-methyl-3-exo(4'-methyl-5'-hydroxypentyl)norcamphor having the formula

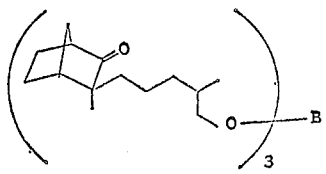

The hydroxyl functional group in the 3-endo-methyl-3-exo(4'-methyl-5'-hydroxypentyl)norcamphor is thereby protected for the subsequent reaction of Step 2.

A reaction mixture comprising 3-endo-methyl-3-exo(4'-methyl-5'-hydroxypentyl)norcamphor, boric acid and/or boric anhydride and a solvent which forms an azeotrope with water is prepared. The boric acid and/or boric anhydride is preferably used in a molar ratio of 3-endo methyl-3-exo(4'-methyl-5'-hydroxypentyl)norcamphor to boric acid of about 3:1, for example 3.1:1 to about 3:1.1, and 3-endo-methyl - 3 - exo(4'-methyl-5'-hydroxypentyl)norcamphor to boric anhydride of about 6:1, for example, 6.1:1 to about 6:1.1. Boric acid and/or boric anhydride can be used herein in amounts more than or less than the amounts above specified. However, if excess boric acid and/or boric anhydride is utilized in the reaction, it must be removed from the reaction mixture in an additional purifying step. If less than the amount specified is utilized herein, a portion of the 3-endo-methyl-3-exo(4'-methyl-5'-hydroxypentyl)norcamphor will not be protected in the second step of this process.

The solvent used herein forms an azeotrope with water and, preferably, is less dense than water. Typical examples of solvents meeting this definition are benzene, toluene and xylene. Benzene and toluene are the preferred solvents for use herein. Generally, the solvent is used in a weight ratio to 3-endo-methyl - 3 - exo(4'-methyl-5'-hydroxypentyl)norcamphor of from about 1:4 to about 100:1, preferably from about 2:1 to about 25:1.

The reaction mixture comprising 3-endo-methyl-3-exo (4'-methyl - 5' - hydroxypentyl)norcamphor, boric acid and/or boric anhydride and the azeotropic solvent is allowed to react for from about 6 to about 36 hours at elevated temperatures ranging from about 30° C. to about 150° C., e.g., generally at solvent reflux temperatures.

The reaction time is, of course, influenced by the reaction conditions. As the boric acid and/or boric anhydride reacts with the 3-endo-methyl-3-exo(4'-methyl-5'-hydroxypentyl)norcamphor, water is formed. When the theoretical amount of water obtainable from the reaction of 3-endo-methyl-3-exo(4'-methyl - 5' - hydroxypentyl)norcamphor and boric acid and/or boric anhydride is formed, heating is discontinued. The resulting mixture contains the borate ester, tri[3-endo-methyl - 3 - exo(4'-methyl-5'-hydroxypentyl)norcamphor]borate and the solvent. The solvent can then be removed by any conventional method, e.g., by distillation, preferably, at reduced pressure. Solvent removal is not necessary, however, as the subsequent reaction of the borate ester in Step 2 can be conducted directly in the azeotropic solvent, preferably benzene or toluene.

It is preferable in the above described step to use an apparatus similar to the Dean-Stark water trap in order to facilitate removal and measurement of the water formed during the reaction. For examples and methods of utilizing the apparatus see Wiberg; Laboratory Techniques in Organic Chemistry, pp. 214–217, McGraw-Hill Book Company, Inc., New York (1960) and Dean et al., "A Convenient Method for the Determination of Water in Petroleum and Other Organic Emulsions," The Journal of Industrial and Engineering Chemistry, 12, pp. 486–490 (May 1920).

This reaction can be carried out in air, however, it is preferred in this step of the reaction to utilize an inert reaction atmosphere. The inert atmosphere can be comprised of nitrogen, argon or any gas which is essentially free of oxygen and does not react with the above-described reactants.

The reaction is allowed to proceed until the borate ester of 3-endo-methyl - 3 - exo(4'-methyl-5'-hydroxypentyl)norcamphor is formed. The reaction of boric acid and 3-endo-methyl - 3 - exo(4'-methyl-5'-hydroxypentyl) norcamphor is normally driven to completion by azeotropic distillation of the water formed in the reaction. The completeness of the reaction can be determined by measuring the amount of water collected and comparing that amount with the theoretical amount obtainable.

When the above reaction has been driven to completion, the reaction product obtained is the borate ester of 3-endo-methyl-3-exo(4'-methyl - 5' - hydroxypentyl)norcamphor having the formula

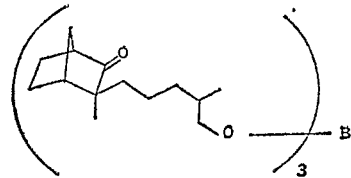

Step 2

The second step of this process comprises reacting the borate ester of 3-endo-methyl-3-exo(4'-methyl-5'-hydroxypentyl)norcamphor with a phosphorus compound selected from the group consisting of methyltriphenylphosphonium bromide, tetramethylphosphonium iodide, methyltricyclohexylphosphonium bromide, methyltri-N-piperidylphosphonium bromide, methyltri-N-morpholiumphosphonium iodide, diphenylmethylphosphine oxide, trimethylphosphine oxide, methyltri-p-tolylphosphonium bromide, methyltri-p-anisylphosphonium bromide, and methyl diethylphosphonate, in strong base, to obtain the borate ester of dihydro-β-santalol having the formula

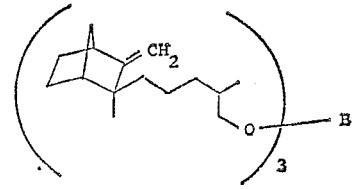

The phosphorus compounds described, used in this step of the process, convert the keto groups at the 2 position in the borate ester of 3-endo-methyl-3-exo(4'-methyl - 5' - hydroxypentyl)norcamphor to a methylene group. The phosphorus compounds used in this step of the process to convert the borate ester of 3-endo-methyl-3-exo(4'-methyl-5'-hydroxypentyl)norcamphor to the borate ester of dihydro-β-santalol are used in a molar ratio to the borate ester of 3-endo-methyl-3-exo(4'-methyl-5'-hydroxypentyl)norcamphor of from about 3:1 to about 15:1, with from about 9:1 to about 12:1 being preferred.

A strong base, described below, is required in this step of the process of this invention for the conversion of the keto group to a methylene group. Although not to be bound by theory, it is believed that the strong base used in this step results in the formation of a phosphorus-substituted carbanion, from the phosphorus compounds described above, which reacts with the borate ester of step 1 converting the keto group at the 2 position to a methylene group. For example, if the phosphorus compound is a phosphonium halide such as methyltriphenylphosphonium bromide, this step of the reaction follows the well-known Wittig reaction route. The Wittig reaction is described in greater detail in Johnson, Ylid Chemistry, pp. 132–192, Academic Press, New York (1960). The strong bases which can be used in this step of the process are methyllithium, n-butyllithium, phenyllithium, sodium hydride, sodium amide, potassium-t-butoxide, sodium ethoxide and sodium propoxide. The strong base is generally used in a molar ratio to the phosphorus compound, used in the keto to methylene group conversion, of from about 0.9:1 to about 1:1.5, preferably from about 1:1 to about 1:1.2.

A solvent is generally utilized in this step to dissolve the borate ester of 3-endo-methyl-3-exo(4'-methyl-5'-hydroxypentyl)norcamphor, the phosphorus compound and the strong base used in this step in converting the keto group at the 2 position. Examples of suitable solvents for use herein include ether solvents such as dimethyl ether, diethyl ether, dibutyl ether, 1,2-dimethoxy-ethane, tetrahydrofuran, and dioxane; hydrocarbon solvents such as hexane, heptane, benzene, toluene and xylene; and dimethylsulfoxide. Where the butoxide, ethoxide and propoxide bases described above are used, alcohol solvents such as ethanol, propanol and butanol can also be used. Dimethyl sulfoxide is the preferred solvent. The solvent is used herein in a weight ratio of solvent to borate ester of Step 1 of from about 1:1 to about 50:1, preferably from about 3:1 to about 15:1.

In Step 2 a reaction mixture comprising the three components described above is generally prepared as follows. The strong base, the phosphorus compound and the solvent are mixed for about 15 minutes to about 2 hours at from about −10° C. to about 40° C. to form the carbanion. A solution of the borate ester, a prepared in Step 1, is then added to the solvent/strong base/phosphorus compound reaction mixture. The reaction mixture is then heated to from about 20° C. to about 100° C. The reaction temperatures utilized are not critical providing extremely high temperatures which promote the formation of by-products or extremely low temperatures which decrease the rate of reaction are not utilized. In order to reduce the formation of by-products, the reaction is preferably run in an oxygen-free atmosphere, e.g., nitrogen or argon. The time required for the reaction to reach completion can vary considerably since it is dependent upon a number of factors such as concentration of reactants, temperature of the reaction mixture, and amount of solvent utilized, but is generally from about 2 to about 40 hours.

Dihydro-β-santalol can be recovered in relatively pure form in the following manner. The reaction product, the borate ester of dihydro-β-santalol, can be added to water or an aqueous solution of, for example, sodium chloride. The borate ester of dihydro-β-santalol, is thus, hydrolyzed to dihydro-β-santalol. Any solvent remaining with the dihydro-β-santalol can be removed by conventional means, e.g., distillation, and the dihydro-β-santalol can be further purified, for example, by distillation or by column chromatography.

Dihydro-β-santalol, prepared by the process of this invention, has a highly desirable and useful odor characterized as strong sandalwood. This compound can be used as a component of perfume compositions for ultimate use in products such as soaps, detergents, deodorants and the like. Perfume compositions containing odoriferously effective amounts, e.g., 0.001% to about 50% of dihydro-β-santalol, are desirable and useful. More specific illustration of the perfume utility of this compound are found in Examples II and IV hereinafter.

EXAMPLES

The following examples illustrate specific preferred embodiments of this invention and are not intended to be limiting. All percentages and ratios in the following examples as well as in the specification and in the appended claims are by weight unless otherwise indicated. Temperatures are expressed in degrees centigrade. Boiling points are not corrected.

Data listed in all of the examples were obtained by means of the following techniques unless otherwise indicated. The apparatus described by Johnson et al., "β-Carbethoxy-γ,γ-Diphenylvinylacetic Acid," Organic Synthesis, 30, p. 18 (1959), was used to maintain a nitrogen atmosphere. Infrared spectra were determined on a Perkin-Elmer Model 137 Spectrophotometer; ultraviolet spectra were determined in ethanol on a Perkin-Elmer Model 202 Spectrophotometer. Nuclear magnetic resonance (N.M.R.) spectra were determined in carbon tetrachloride with a Varian Model HA–100 Spectrometer with chemical shifts measured relative to tetramethylsilane (10 τ). The N.M.R. data are in the order chemical shift, integration, multiplicity, coupling constant (in Hz.), and assignment. Gas-liquid chromatography (g.l.p.c.) was accomplished with an Aerograph Model 202B using a flow rate of 100 ml./min. on 5-ft. by 0.25-in. columns packed with (A) 20% FFAP (Carbowax 20M terminated with nitroterephthalic acid) on 60/80 mesh Chromosorb P or (b) 20% SE 30 (a methyl silicone gum rubber compound) on 60/80 mesh Chromosorb W.

EXAMPLE I (A) Preparation of 3-endo-methyl-3-exo(4'-methyl-5'-hydroxypentyl)norcamphor The starting compound for this invention, 3-endo-methyl-3-exo(4'-methyl-5'-hydroxypentyl)norcamphor was prepared according to the process set forth in the copending U.S. patent application of Fanta and Erman, 3-endo-Methyl-3-Exo(4' - Methyl-5'-Hydroxypentyl)Norcamphor and 2-Methyl-5-Bromopentanol, and Process for the Preparation of These Compounds, Ser. No. 717,360, filed Mar. 29, 1968 in Example I, pages 17 to 22. In this process, 2-methyl-4-pentanol is borated with boric acid to form tri(2-methyl-4-pentenyl)borate. The borate is hydrobrominated by a free radical addition and then hydrolyzed to obtain 2-methyl-5-bromopentanol. The bromopentanol is borated with boric acid and, subsequently, this product is reacted with the enolate of 3-methylnorcamphor and then hydrolyzed to form 3-endo-methyl-3-exo(4'-methyl-5'-hydroxypentyl)norcamphor.

(B) Preparation of the borate ester of 3-endomethyl-3-exo(4'-methyl-5'-hydroxypentyl)norcamphor (Step 1)

A 500 ml. flask fitted with a Dean-Stark trap and condenser was charged with a solution of 9.40 g. of 3-endo-methyl-3-exo(4' - methyl-5'-hydroxypentyl)norcamphor in 100 ml. of benzene and 880 mg. of boric acid. The reaction was refluxed under nitrogen for 21 hours until the theoretical amount of $H_2O$ (0.8 ml.) had been collected.

The solution was cooled slightly and the solvent was removed at reduced pressure to afford 10.4 g. of crude borate ester, $\lambda_{max.}^{film}$ 5.72, 7.08, 7.50, 9.69, 10.59, 10.98μ

This material, tri[3-endo-methyl-3-exo(4'-methyl - 5' - hydroxypentyl)norcamphor]borate was used directly in Step 2 below without further purification.

Results substantially similar to those achieved in the above example are obtained when 495 mg. of boric anhydride are substituted for the 880 mg. of boric acid in that the borate ester of 3-endo-methyl-3-exo(4'-methyl-5'-hydroxypentyl)norcamphor is formed. Substantially similar results are also obtained when toluene and xylene are substituted for benzene on an equal weight basis or when mixtures of boric acid and boric anhydride are substituted for boric acid on an equivalent basis.

(C) Preparation of the borate ester of dihydro-β-santalol (Step 2)

A mixture of 4.9 g. of a 61% mineral oil dispersion of sodium hydride and 100 ml. of anhydrous dimethyl sulfoxide was heated under nitrogen for 1 hour at 70° C. The resulting solution was cooled to 0° C. and treated with a warm solution of 49 g. of methyltriphenylphosphonium bromide in 150 ml. of anhydrous dimethyl sulfoxide. The resulting mass was warmed to room temperature, stirred for 0.5 hr., and treated with a solution of 10.4 g. of crude borate, prepared in Step 1 above, in a minimum of diethyl ether. The reaction mixture was stirred for an additional 0.5 hr. at room temperature and for 24 hrs. at 70° C. before being cooled and added to water. The product was isolated with pentane and the combined extracts were washed once with water and twice with a saturated sodium chloride solution prior to drying over magnesium sulfate. Solvent removal and subsequent distillation gave 8.87 g. (95%) of clear product which was shown to be 87% pure by g.l.p.c. Distillation of the crude dihydro-β-santalol afforded dihydro-β-santalol, B.P. 110–115° C. at 0.03 mm. Hg. The dihydro-β-santalol obtained can be further purified by column chromatography (Florisil elution with 2 to 5% ether in hexane). The pure material exhibited $n_D^{26}$ 1.4920, $\lambda_{max.}^{film}$ 3.00, 3.29, 6.03, 7.31, 9.01, 9.65, 11.37μ

N.M.R. signals at τ 5.32, 5.59 (2H, C=C$H_2$), 5.89 (1H, OH), 6.50–6.90 (2H, C$H_2$OH), 7.38 (1H, $C_1$—H), 7.94 (1H, $C_4$—H), 9.00 (C$H_3$), 9.13 (doublet, J=7 Hz., CHC$H_3$).

Substantially similar results can be obtained in Step 2 above when other phosphorus compounds, e.g., tetramethylphosphonium iodide, methyltricyclohexylphosphonium bromide, methyltri - N - piperidylphosphonium bromide, methyltri - N - morpholiumphosphonium iodide, diphenylmethylphosphine oxide, trimethylphosphine oxide, methyltri - p - tolylphosphonium bromide, methyltri-p-anisylphosphonium bromide, and methyl diethylphosphonate, are substituted on an equivalent basis for the methyltriphenylphosphonium bromide used in that the borate ester of dihydro-β-santalol is formed and when said phosphorus compounds are used in a molar ratio to the borate ester of 3-endo-methyl-3-exo(4'-methyl - 5' - hydroxypentyl) norcamphor of from about 3:1 to about 15:1.

Substantially similar results can be obtained when in Step 2 above other solvents are substituted on an equivalent basis for the dimethyl sulfoxide used in that the borate ester of dihydro-β-santalol is formed, e.g., ether solvents such as dimethyl ether, diethyl ether, butyl ether, 1,2-dimethoxyethane, tetrahydrofuran, and dioxane; hydrocarbon solvents such as hexane, heptane, benzene, toluene, and xylene when said solvents are substituted in a weight ratio of solvent to the borate ester reaction product from Step 1 of from about 1:1 to 50:1.

Substantially equivalent results can be obtained in Step 2 above when other strong bases are substituted on an equivalent basis for the sodium hydride used in that the borate ester of dihydro-β-santalol is formed, e.g., methyllithium, n-butyllithium, phenyllithium, sodium amide, potassium-t-butoxide, sodium ethoxide and sodium propoxide and when said strong bases are used in a molar ratio to the methyl triphenylphosphonium bromide of from about 0.9:1 to about 1:1.5.

Substantially similar results can also be obtained in Step 2 when the sodium hydride is replaced by a strong base such as potassium-t-butoxide, sodium ethoxide, and sodium propoxide used in combination with alcohol solvents such as ethanol, propanol, and butanol in that the borate ester of dihydro-β-santalol is formed.

EXAMPLE II

Perfume compositions

Perfume compositions containing dihydro-β-santalol are prepared by mixing the components shown below in the amounts indicated. The compositions exhibit highly desirable and useful odors.

Composition A: Narcissus

| Component: | Percent by weight |
|---|---|
| Dihydro-β-santalol | 10.00 |
| Neroli oil | 4.00 |
| Vetivert oil | 12.50 |
| Isobutyl salicylate | 14.50 |
| Phenylacetic aldehyde | 5.00 |
| Paracresyl acetate | 20.00 |
| Ylang ylang | 8.50 |
| Helitropin | 5.50 |
| Cinnamic alcohol | 20.00 |

Composition B: Chypre

| Component: | Percent by weight |
|---|---|
| Essence oakmoss | 5.00 |
| Bergamot oil | 22.50 |
| Vetivert oil | 7.50 |
| Oil of lavender | 5.00 |
| Dihydro-β-santalol | 7.50 |
| Patchouli | 1.00 |
| Clove bud oil | 3.50 |
| Jasmine complex | 10.00 |
| Rose complex | 8.00 |
| Isobutyl salicylate | 7.50 |
| Cinnamic alcohol | 5.00 |
| Heliotropin | 10.00 |
| Coumarin | 5.00 |
| Resin aroma of tonka bean | 2.00 |
| Methyl nonyl acetic aldehyde | 1.50 |

The components and proportions in the perfume compositions of this example can be adjusted according to methods well known in the perfume art to form a wide variety of desirable perfume compositions containing odoriferously effective amounts of these compounds.

EXAMPLE III

Soap bar composition

A conventional household soap bar having the following composition is prepared:

| Component: | Percent by weight |
|---|---|
| Sodium soap | 75.0 |
| Potassium soap [1] | 7.5 |
| Water | 15.0 |
| Perfume Composition A of Example II | 2.5 |
| Total | 100.0 |

[1] The total soap comprises a mixture of 80% tallow soap and 20% coconut soap.

This soap bar exhibits a desirable narcissus fragrance. Composition B of Example II can be substituted for Composition A in the above soap bar composition to attain a chypre fragrance.

EXAMPLE IV

Detergent composition

A conventional, granular, heavy-duty built detergent composition having the following composition is prepared:

| Component: | Percent by weight |
|---|---|
| Sodium dodecyl benzene sulfonate | 20.0 |
| Sodium tripolyphosphate | 50.0 |
| Sodium silicate ($SiO_2:Na_2O$ ratio of 2:1) | 6.0 |
| Sodium sulfate | 14.0 |
| Water | 9.8 |
| Perfume Composition A of Example II | 0.2 |
| Total | 100.0 |

The detergent composition exhibits a desirable narcissus fragrance. Composition B of Example II can be substituted for Composition A to attain a highly desirable chypre fragrance.

What is claimed is:
1. A process for preparing dihydro-β-santalol comprising the steps of:
   (1) dissolving 3-endo-methyl-3-exo(4'-methyl-5'-hydroxypentyl)norcamphor and a compound selected from the group consisting of boric acid, boric anhydride and mixtures thereof, in a molar ratio of about 3 moles of said norcamphor compound to 1 mole of boric acid or in a ratio of about 6 moles of said norcamphor compound to 1 mole of boric anhydride, in a solvent capable of forming an azeotrope with water and heating the resulting solution at a temperature of from about 30° C. to about 150° C. for a period of time sufficient to obtain the theoretical amount of water formed and removing said water to obtain the borate ester of 3-endo-methyl-3-exo(4'-methyl-5'-hydroxypentyl)norcamphor having the formula

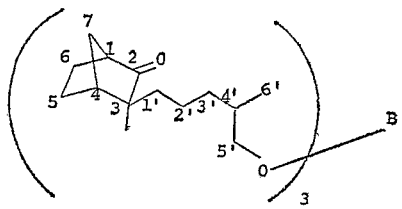

(2) dissolving a phosphorus compound selected from the group consisting of methyltriphenylphosphonium bromide, tetramethylphosphonium iodide, methyltricyclohexylphosphonium bromide, methyltri-N-piperidylphosphonium bromide, methyltri-N-morpholium-phosphonium iodide, diphenylmethylphosphine oxide, trimethylphosphine oxide, methyltri-p-tolylphosphonium bromide, methyltri-p-anisylphosphonium bromide and methyl diethylphosphonate and a strong base which is selected from the group consisting of methyllithium, n-butyllithium, phenyllithium, sodium hydride, sodium amide, potassium-t-butoxide, sodium ethoxide and sodium propoxide in a solvent capable of dissolving the phosphorus compound, the strong base, and the borate ester of 3-endo-methyl-3-exo(4'-methyl-5'-hydroxypentyl)norcamphor and allowing the phosphorus compound to react with the strong base for periods of from about 15 minutes to about 2 hours at temperatures from about −10° C. to about 40° C.;

(3) adding the borate ester of 3-endo-methyl-3-exo(4'-methyl-5'-hydroxypentyl)norcamphor prepared in Step (1) to the reaction solution prepared in Step (2) and heating said solution to a temperature of from about 20° C. to about 100° C. for from about 2 hours to about 40 hours to form the borate ester of dihydro-β-santalol; and (4) hydrolyzing said borate ester of dihydro-β-santalol and recovering the dihydro-β-santalol.

2. The process of claim 1 wherein the solvent which forms an azeotrope with water used in Step (1) is selected from the group consisting of benzene, toluene and xylene.

3. The process of claim 1 wherein the solvent which forms an azeotrope with water used in Step (1) is utilized in a weight ratio of said solvent to 3-endo-methyl-3-exo(4' - methyl-5' - hydroxypentyl)norcamphor of from about 1:4 to about 100:1.

4. The process of claim 1 wherein the phosphorus compound is used in a molar ratio to the borate ester of 3-endo-methyl-3-exo(4' - methyl - 5' - hydroxypentyl)norcamphor of from about 3:1 to about 15:1; wherein the solvent capable of dissolving the phosphorus compound, the strong base and the borate ester of 3-endo-methyl-3-exo(4'-methyl-5'-hydroxypentyl)norcamphor is utilized in a weight ratio of solvent to the borate ester of 3-endo-methyl-3-exo(4'-methyl-5'-hydroxypentyl)norcamphor of from about 1:1 to about 50:1; and wherein the strong base is used in a molar ratio to the phosphorus compound of from about 0.9:1 to about 1:1.5.

5. The process of claim 1 wherein the solvent used in Step (2) to dissolve the borate ester 3-endo-methyl-3-exo(4'-methyl-5'-hydroxypentyl)norcamphor, the phosphorus compound and the strong base is a member selected from the group consisting of ether solvents, alcohol solvents, hydrocarbon solvents and dimethyl sulfoxide.

6. The process of claim 1 wherein, in Step (2), the phosphorus compound is selected from the group consisting of methyltriphenylphosphonium bromide, tetramethylphosphonium iodide, methyltricyclohexylphosphonium bromide, diphenylmethylphosphine oxide, and methyl diethylphosphonate.

7. The process of claim 6 wherein the phosphorus compound is methyltriphenylphosphonium bromide.

8. The process of claim 1 wherein, in Step (2), the strong base is selected from the group consisting of potassium-t-butoxide, sodium ethoxide, and sodium propoxide and wherein the solvent is an alcohol solvent.

References Cited
UNITED STATES PATENTS

| 2,760,993 | 8/1956 | Chang | 260—631 |
| 2,571,194 | 10/1951 | Brothman | 260—462 X |

BERNARD HELFIN, Primary Examiner

M. W. GLYNN, Assistant Examiner

U.S. Cl. X.R.

260—462 R

PO-1050
(5/69)

UNITED STATES PATENT OFFICE
CERTIFICATE OF CORRECTION

Patent No. 3,662,007            Dated May 9, 1972

Inventor(s) Wayne I. Fanta and William F. Erman

It is certified that error appears in the above-identified patent and that said Letters Patent are hereby corrected as shown below:

Column 5, line 1, after "described" insert -- above --.

Column 5, line 55, after "ester," "a" should read "as".

Column 8, line 42, "7.50" should read "7.00".

Column 8, line 47, "7.50" should read "7.00".

Column 10, line 47, "6" should read "1".

Signed and sealed this 7th day of November 1972.

(SEAL)
Attest:

EDWARD M. FLETCHER, JR.
Attesting Officer

ROBERT GOTTSCHALK
Commissioner of Patents